United States Patent [19]

Kansupada

[11] Patent Number: 5,352,498
[45] Date of Patent: Oct. 4, 1994

[54] PACKAGE FOR COMPOUNDING RUBBER AND COMPOUNDED RUBBER

[75] Inventor: Bharat K. Kansupada, Mogadore, Ohio

[73] Assignee: The Goodyear Tire & Rubber Company, Akron, Ohio

[21] Appl. No.: 932,115

[22] Filed: Aug. 19, 1992

[51] Int. Cl.$^5$ .............................................. B29D 22/00
[52] U.S. Cl. ................... 428/35.5; 428/35.2; 428/35.7; 525/186; 525/412
[58] Field of Search ............... 428/35.2, 35.4, 35.5, 428/480, 220, 35.7; 525/186, 412

[56] References Cited

U.S. PATENT DOCUMENTS

| | | | |
|---|---|---|---|
| 4,141,863 | 2/1979 | Coran et al. ............................ | 260/3 |
| 4,144,223 | 3/1979 | Kent ..................................... | 260/42.47 |
| 4,421,898 | 12/1983 | Lundberg et al. .................. | 525/186 |
| 4,826,910 | 5/1989 | Schwarz .............................. | 525/521 |
| 5,108,807 | 4/1992 | Tucker ................................ | 428/35.2 |

*Primary Examiner*—Ellis P. Robinson
*Assistant Examiner*—Michael A. Williamson
*Attorney, Agent, or Firm*—Henry C. Young, Jr.

[57] ABSTRACT

A package comprised of at least one compounding ingredient for unvulcanized rubber contained in a protective film of a thermoplastic polycaprolactone. The invention further relates to a compounded rubber comprised of a mixture of unsaturated rubber and a package of compounding ingredients contained in the polycaprolactone film. For such purposes, the polycaprolactone film can be in the form of a bag thereof.

5 Claims, No Drawings

PACKAGE FOR COMPOUNDING RUBBER AND COMPOUNDED RUBBER

TECHNICAL FIELD

This invention relates to packaged materials for compounding rubber and to rubber compounded therewith.

BACKGROUND ART

Unvulcanized rubber and/or compounding ingredients therefor are often packaged in thermoplastic film, particularly where the film is in the form of a bag thereof.

A purpose for the film packaging is to minimize loss of material, such as by spillage or by airborne losses, e.g. compounding ingredients for rubber; to minimize a tendency for some of such ingredients to cake together in high humidity situations; and to maximize ease of handling, all of the rubber mixing operation for a rubber products manufacturing facility.

Thus, such packaging of rubber compounding ingredients with a thermoplastic film is often found to be useful for adding compounding ingredients to rubber on a uniform basis.

However, various criteria are important for selecting a suitable thermoplastic film material, particularly a bag thereof, for such purpose.

In one aspect, the film should readily disperse in the rubber to which it is added and mixed.

It is important to appreciate that, for many rubber mixing operations, rubber is mixed with its compounding ingredients in two or more sequential mixing stages. Conventionally, such mixing stages consist of a first, or at least one initial non-productive, mixing stage and a second, or at least one subsequent productive, mixing stage. Additional mixing stages can also be used. In such circumstance, rubber is first mixed in a non-productive mixing stage with its compounding ingredients exclusive of curatives such as sulfur and cure accelerators. In the non-productive mix stage, rubber, carbon black, rubber processing oil and other additives, normally exclusive of curatives. In the non-productive mixing stage, the mixing temperatures are usually relatively high, such as, for example, about 130° C. to about 170° C.

In a subsequent productive mixing stage, sulfur is added to the non-productive mix batch. Processing oil is not conventionally added to the productive mix stage except perhaps a very small amount to reduce the dusting of the ingredients. A lower mixing temperature is used such as, for example, about 90° C. to about 115° C., because of the curatives being present and the mixing can occur over a considerably shorter period of time as compared to the non-productive mixing stage(s).

While various thermoplastic films may be useful for adding basic compounding ingredients to the non-productive mixing stage and which have been found to satisfactorily disperse in the rubber mixture under such circumstances, special considerations have to be given to the productive mixing stage, which is typically although not universally, the second mixing stage.

As heretofore pointed out, the productive mix stage is conventionally operated at a lower temperature (e.g. 110°–120° C.) than that of its preceding non-productive mix stage.

Therefore, for the aforesaid thermoplastic film to be satisfactory for introducing rubber compounding ingredients into the productive mix stage, not only should the film have a softening below the stage's mixing temperature, but it needs to adequately disperse within the compounded rubber at the lower mix temperature and in a relatively short period of time.

Normally, in the non-productive mix stage, about 10 to about 40 phr of processing oil is included.

However, in a more specific case, where a relative high loading of oil is used in the non-productive mix stage for the rubber composition, the productive mix stage is typically operated at a somewhat lower temperature (e.g. 90°–100° C.) and, perhaps more importantly, a lower mix shear is inherently developed due to the highly oil loaded rubber composition.

Thus, with the reduced shear, it becomes more difficult to adequately disperse the aforesaid film in the rubber composition in the productive mix stage over a relatively short period of time.

Thus, the film should quickly melt and flow under the rubber mixing conditions in the productive mix stage which include its mixing temperature and mixing shear forces. Further, the film should disperse into the rubber under the mixing conditions over a very short period of time.

Accordingly, such thermoplastic film should have a softening point (or melting point) below about 70° C. and flow under the aforesaid mixing shear forces in the productive mix stage, including circumstances where a relatively large amount of oil has been mixed with the rubber in the non-productive mix stage which reduces the mixing shear forces.

The softening points of the films has been one of the important factors for their selection as well as other factors, including their relative strength and their compatibility with the rubber and associated resulting compounded rubber properties.

Overall strength of the film and resistance of the film to chemical action of certain compounding ingredients, such ass for example, antioxidants, antiozonants, oleic acids and napthenic oil are also important considerations.

A suitable overall strength of the film can be determined by filling a bag composed of the polycaprolactone film having a thickness of about 2 mils, or 0.05 mm and at about 23° C. with one or more of rubber compounding ingredients without rubber processing oil.

A suitable chemical resistance to certain of rubber compounding ingredients can be determined by filling a bag composed of the polycaprolactone film having a thickness of about 2 mils (0.05 mm) with one or more of oleic acid, non-reactive phenolformaldehyde resin, hexamethoxymelamine and insoluble sulfur/oil blends for rubber compounding purposes storing the filled bag at about 23° C. for about 72 hours and then lifting the bag without supporting its bottom. If the bag does not leak through its film, or the film does not rupture, the film is considered as being acceptable under the chemical resistance test and also the aforesaid strength test. The chemical resistivity of the film is deemed to be not suitable if the film dissolves or leaks it contents through the film itself.

Therefore, for a film to be considered to be suitable for the purposes of this invention, it is required to have a melting point below 70° C., of a suitable overall strength, and a suitable chemical resistivity and an ability to adequately disperse in rubber when mixed therein over a relatively short period of time at a temperature of about 90° to about 105° C.

The aforesaid dispersion requirement extends to highly oil loaded rubber compositions blends to which relative large amounts of oil is added during the mixing of packaged compounding ingredients with the rubber in the non-productive mix stage (e.g. by adding from 60 to 90 phr of oil). The term "phr" relates to parts by weight per 100 parts by weight rubber.

Thus, the selection of a suitable film can only be determined by experimentation concerning its strength, chemical resistivity and dispersion-in-rubber ability under prescribed circumstances. In addition, the film, as a rubber ingredient bag, should not have deleterious effect on the compounded rubber's physical properties such as, for example, tensile strength and elongation.

Polyethylene, while it has been used for rubber packaging and sometimes rubber compounding ingredient packaging in some circumstances, is often considered to be disadvantageous because, when mixed with unvulcanized rubber, it does not usually disperse sufficiently well in the rubber blend at a temperature of about 90° C. to about 105°.

Films of ethylene/vinyl acetate copolymer and of syndiotactic polybutadiene have been used for packaging rubber compounding ingredients for rubber mixing purposes.

Syndiotactic polybutadiene has also been used for such purpose but has not been observed to have a good chemical resistance against oleic acid.

It is still desired to provide films for such packaging purposes which will melt at or below the rubber mixing temperatures and flow under the mixing shear conditions to adequately disperse in the rubber during relatively short mixing times, as well as to exhibit good strength and chemical resistance. The films are, therefore, desired to be suitable for preparing packaged rubber compounding ingredients for mixing with rubber and to provide rubber compounded with such a package.

DISCLOSURE AND PRACTICE OF INVENTION

In accordance with this invention a package is provided which comprises (A) compounding ingredients for unvulcanized rubber packaged in (B) a protective film having a thickness in the range of about 0.02 to about 0.08, preferably about 0.04 to about 0.06, mm of thermoplastic polycaprolactone, where such polycaprolactone is characterized by having a melting point in the range of about 60° C. to about 70° C., a melt flow index at 190° C. and about 440 psi of about 5 to about 7 gm/min, and a molecular weight (number average) in a range of about 70,000 to about 90,000.

The polycaprolactone is sometimes known as a homopolymer of 2-oxypanone.

It is understood that the film composite of this invention desirably can contain various typical lubricants, fillers, pigments and dyes and stabilizers.

Thus, in the practice of this invention, a method of compounding rubber is provided and the resulting compounded rubber, which comprises mixing unvulcanized rubber, particularly high unsaturation rubber, with the package of this invention containing conventional rubber compounding ingredients optionally followed by sulfur curing said prepared mixture of rubber, packaging film and packaged ingredients. The invention is particularly applicable where about 2 to about 40 and even up to about 90 phr of rubber processing oil is mixed with the rubber, usually exclusive of the ingredients in the said package.

The term "phr" relates to "parts by weight per 100 parts by weight rubber".

In one aspect of this invention, the package is of compounding ingredients comprised of sulfur, sulfur cure accelerator(s) and sulfur cure activators for rubber. Such types of curative materials are well known to those having skill in the rubber compounding art. As mentioned herein, such ingredients can contain a very, very small amount of oil.

In another aspect of this invention, a method of compounding rubber comprises the steps of (A) blending an unvulcanized unsaturated diene-based rubber (SBR, cis 1,4-polyisoprene, cis 1,4-polybutadiene, isoprene/-butadiene, styrene/isoprene/butadiene, 3,4-polyisoprene, and the like) and rubber compounding ingredients therefor, exclusive of sulfur and sulfur cure accelerators therefor in at least one non-productive mixing stage and (B) in a subsequent productive mixing stage, blending at least one package comprised of sulfur and sulfur cure accelerator(s) for rubber in a bag of polycaprolactone film with such non-productive blend (A).

Various rubber compounding ingredients are contemplated for packaging according to this invention and then compounded with unvulcanized rubber. Representative of the various contemplated compounding ingredients are fillers, such as clay, silicates, calcium carbonate, accelerators, such as, for example, tetramethylthiuram disulfide, benzothiazyl disulfide and the like; antioxidants and antiozonants, curatives such as sulfur and accelerators, titanium dioxide, reinforcing pigments, such as carbon black, zinc oxide and hydrated silicon compounds; and processing aids, such as silicon dioxide, pumice, and stearate and which can include a very small rubber amount of processing oil when mixed with at least one other of such compounding ingredient.

In this manner, while the term "packaged" primarily relates to bagged compounding ingredients, it can also relate to compounding ingredients which are otherwise wrapped in the film.

For the purposes of the description of this invention, the term "rubber compounding ingredients", to be packaged with the polycaprolactone film for the productive mix stage, does not include rubber processing oils, except for a very small amount which aids in the reduction of dusting of the compounding ingredients which is typically less than about 2 phr.

Films of this invention have been observed to disperse readily in a rubber compound when using conventional rubber mixing equipment.

The practice of this invention is further illustrated by reference to the following examples which is intended to be representative rather than restrictive of the scope of the invention. Unless otherwise indicated, all parts and percentages are by weight.

EXAMPLE 1

Polycaprolactone film having a thickness of about 2 mil, or about 0.05 mm, was evaluated for use as a packaging material for rubber compounding ingredients to be used for mixing with rubber.

The film was subjected to a relative strength and chemical stability test in which the bags were composed of a sheet film, having the dimensions of 23 inches by 26 inches, or about 58 cm by about 66 cm, and folded with its two sides heat sealed thereby leaving is top open, were individually filled with about 20 to about 25 pounds, or about 9 to about 11 kg, of oleic acid, hexamethoxymelamine and non-reactive phenolformaldehyde resin.

The filled bags were stored for about 72 hours, and at about 23° C., following which they were lifted without supporting the bottom of the bags. The film did not rupture or tear. Therefore, the film was considered to have passed the relative strength and chemical stability tests.

The film was evaluated for its dispersibility in rubber. For such evaluation, the film was cut into square pieces with a dimension of about 1 inch by 1 inch (2.5 by 2.5 cm) and blended in various amounts in a rubber composition mixture, representing five, ten and fifty times an amount considered to be representative, or typical, of the amount of film which could be expected to be introduced into the rubber if the rubber cure compounding ingredients for a productive rubber mix stage were to be used. For this Example, such typical amount of film for a bag to be used in the productive mix stage was deemed to be about 0.02 phr.

The rubber composition used for the film dispersibility test was comprised of the following formulation shown in Table 1.

TABLE 1

| Material | Parts (Rounded) |
| --- | --- |
| A. First Mixing Stage (about 330° C.)[1] | |
| SBR Rubber, oil extended (37.5 phr oil) | 137.5 |
| Carbon Black (N110) | 130 |
| Rubber Processing Oil | 32 |
| Tackifier Resin | 21 |
| Stearic Acid | 5 |
| Zinc Oxide | 5 |
| Antidegradant(s) | 2 |
| B. Second Mixing Stage (about 98° C.)[1] | |
| Film[2] | * |
| Accelerator, Sulfenamide Type | 3 |
| Tetramethyl Thiuram Disulfide | 1.5 |
| Sulfur | 1 |

1. The discharge temperature from the rubber mixing apparatus.
2. The polycaprolactone film squares added in 5X, 10X and 50X amounts, having a melting point of about 65° C. measured by differential scanning calorimeter at 10° C./min. and reportedly having a melt flow index at 190° C. and 440 psi of about 6 g/min and, reportedly, a number average molecular weight of about 80,000.

The rubber composition was removed from the second, productive stage rubber mixer when the mixture reached about 98° C. and was visually inspected for any undispersed film. No undispersed film was observed, indicating that the dispersion test was successful.

The rubber blend was then banded on a cylindrical mill and samples taken for visual evaluation for dispersibility of the film in the rubber. No clumps of film or other residue of film was observed in the rubber composition, also indicating that the dispersion test was successful.

EXAMPLE II

Samples of the rubber compositions of Example I (about 4 inches by about 6 inches, or about 10 cm by about 15 cm) were then cured at about 150° C. for about 18 minutes and the cured sheet cut into pieces and cross-sections visually examined. No clumps or pieces of the film were observed in the cured sheet, further indicating that the film passed the rubber composition dispersibility test.

The cured rubber was further evaluated for physical properties, compared to a control rubber of the formulation shown in Table 1 but without the film being added, with results shown in Table 2. The results are normalized to an assigned value of 100 for the control.

TABLE 2

| | Rubber Composition[1] | | | |
| --- | --- | --- | --- | --- |
| Property | Exp A (5X) | Exp B (10X) | Exp C (50X) | Exp D (Control) |
| Tensile (MPA) | 107 | 98 | 97 | 100 |
| 300% Modulus (MPA) | 122 | 116 | 105 | 100 |
| % Rebound[2] | 103 | 103 | 107 | 100 |
| T$_{90}$ (at 150° C.)[3] | 100 | 100 | 100 | 100 |

1. Exp. A, Exp. B and Exp. C represent rubber compositions prepared according to Example I with the amounts of film mixed therein being 5X, 10X and 50X, respectively. Exp. D is the control rubber without the polycaprolactone film.
2. ASTM D-1054.
3. The T$_{90}$ values relate to the time to reach a 90 percent state of cure at 150° C. as determined by a curemeter instrument.

Therefore, it is also considered that film passed the rubber dispersibility test according to the physical properties of the resultant cured rubber being similar to those of the control and, thus, not affected by the presence of the dispersed film.

A tear test evaluation of the samples, including the control, was conducted in which the samples demonstrated a lower value than the control. Such test is a measure of the adhesion of the sheet to itself by, in essence, pressing two sheets together and measuring the force to pull them apart. The variation in results was considered to be within acceptable limits.

Results of these tests show that polycaprolactone passed tests designed to determine their suitability for use as packaging films for rubber compounding ingredients which are to be mixed and cured with sulfur vulcanizable rubber.

While certain representative embodiments and details have been shown for the purpose of illustrating the invention, it will be apparent to those skilled in this art that various changes and modifications may be made therein without departing from the spirit or scope of the invention.

What is claimed is:

1. A compounded rubber comprised of a mixture of unsaturated rubber and a package which comprises (A) compounding ingredients for unvulcanized rubber packaged in (B) a protective film having a thickness in the range of about 0.02 to about 0.08 mm consisting essentially of a thermoplastic polycaprolactone containing an anti-block agent and further characterized by a melting point in the range of about 60° C. to about 70° C., a melt flow index at 190° C. and about 440 psi of about 5 to about 7 g/min, and a molecular weight (number average) in a range of about 70,000 to about 90,000.

2. The compounded rubber of claim 1 wherein said compounding ingredients are comprised of (i) sulfur and at least one cure accelerator and, optionally, (ii) at least one of antioxidant(s), antiozonant(s), carbon black, zinc oxide, and a very small amount of rubber processing oil when mixed with at least one other of such compounding ingredients.

3. A compounded rubber prepared by the steps of (A) blending an unvulcanized unsaturated diene-based elastomer and rubber compounding ingredients therefor, exclusive of sulfur and sulfur cure accelerators for rubber, in at least one non-productive mixing stage to form a non-productive blend; and (B) in a subsequent, productive mixing stage, blending at least one package which comprises (i) sulfur and sulfur cure accelerator(s) for rubber packaged in (ii) a protective film having a thickness in the range of about 0.02 to about 0.08 mm consisting essentially of a thermoplastic polycaprolactone containing an anti-block agent and further characterized by a melting point in the range of about 60° C. to about 70° C., a melt flow index at 190° C. and about 440 psi of about 5 to about 7 g/min, and a molecular weight (number average) in a range of about 70,000 to about 90,000.

4. The compounded rubber of claim 2 which is subsequently sulfur cured.

5. The compounded rubber of claim 3 wherein said compounding ingredients are comprised of sulfur and sulfur cure activators for rubber.

* * * * *

UNITED STATES PATENT AND TRADEMARK OFFICE
CERTIFICATE OF CORRECTION

PATENT NO. : 5,352,498
DATED : October 4, 1994
INVENTOR(S) : Bharat K. Kansupada, et al It is certified that error appears in the above-indentified patent and that said Letters Patent is hereby corrected as shown below:

On the title page, item [19] should read --Kansupada, et al --.

item [75] Inventors: should read

Bharat Kanchanlal Kansupada, Mogadore, Ohio
           Robert Joe Taylor, Akron, Ohio Signed and Sealed this Fifteenth Day of October, 1996

Attest:

BRUCE LEHMAN

*Attesting Officer*      *Commissioner of Patents and Trademarks*